United States Patent [19]

Goergen et al.

[11] 4,397,344
[45] Aug. 9, 1983

[54] TREAD FOR HEAVY-DUTY RADIAL TIRES

[75] Inventors: Rene Goergen, Colmar-Berg; Guy J. Kind, Luxembourg, both of Luxembourg

[73] Assignee: The Goodyear Tire & Rubber Company, Akron, Ohio

[21] Appl. No.: 369,381

[22] Filed: Apr. 19, 1982

Related U.S. Application Data

[63] Continuation-in-part of Ser. No. 268,316, May 29, 1981, abandoned.

[51] Int. Cl.³ .............................................. B60C 11/06
[52] U.S. Cl. ................................ 152/209 R; D12/146; D12/147
[58] Field of Search ............ 152/209 R, 209 A, 209 B, 152/209 NT, 209 WT, 209 D; D12/146–149, 150–151

[56] References Cited

U.S. PATENT DOCUMENTS

| | | | |
|---|---|---|---|
| D. 261,130 | 10/1981 | Armager | D12/147 |
| 3,674,077 | 7/1972 | Verdier | 152/209 R |
| 4,230,512 | 10/1980 | Makino et al. | 152/209 R |

FOREIGN PATENT DOCUMENTS

| | | | |
|---|---|---|---|
| 614574 | 6/1935 | Fed. Rep. of Germany | 152/209 R |
| 489359 | 10/1938 | United Kingdom | 152/209 R |
| 1202283 | 8/1970 | United Kingdom | 152/209 R |

Primary Examiner—Edward C. Kimlin
Assistant Examiner—Lois E. Boland
Attorney, Agent, or Firm—L. R. Drayer

[57] ABSTRACT

A heavy-duty radial tire has a tread with a plurality of parallel ribs separated and defined by a plurality of long, wide grooves. Each rib is inclined to the mid-circumferential plane of the tire and extends across substantially the entire width of the tread and over an arc of the tread equal to at least 45 degrees and not more than about 180 degrees. The ribs are uninterrupted by long, wide grooves over substantially their entire length. A short, wide groove is located in the portion of each rib adjacent to each axially outer edge of the tread, and each short, wide groove is connected through a transverse groove with a short, wide groove located in the portion of a rib adjacent to the opposite axially outer edge of the tread to aid in water evacuation.

10 Claims, 3 Drawing Figures

TREAD FOR HEAVY-DUTY RADIAL TIRES

This is a Continuation-in-part of application Ser. No. 268,316, filed May 29, 1981, now abandoned.

This invention relates to tires and, more particularly, heavy-duty radial tires.

Conventional free-rolling, heavy-duty radial tires, such as free-rolling truck tires, have been provided with treads having several ribs separated by wavy or zig-zag grooves which extend entirely about the tire and are oriented parallel to the mid-circumferential plane of the tire. Such treads are prone to "river wear" and uneven shoulder wear. By "river wear" is meant a type of wear which may be characterized by furrows in the ribs alongside the edges thereof.

It is an object of this invention to provide a novel tread configuration for heavy-duty radial tires which will eliminate or substantially reduce river wear and uneven shoulder wear. Other objects of this invention will be made apparent hereinafter.

There is provided in accordance with one aspect of the present invention a radial tire having a rotational axis and a tread, with first and second axially outer edges, the tread having a tread width equal to the distance between the first and second axially outer edges as measured parallel to the axis, the tread comprising: a plurality of parallel ribs extending substantially uninterrupted between the first and second axially outer edges of the tread, the ribs being inclined to the mid-circumferential plane of the tire and extending over an arc of the tread which is equal to at least 45 degrees and not more than about 180 degrees; a plurality of long, wide grooves extends between the first and second axially outer edges of the tread to separate and define the ribs, each long, wide groove extending alternately in a direction oblique to the circumferential direction of the tire to provide good traction, and then in a direction substantially parallel to the circumferential direction of the tire a distance equal to between one-half and twice the distance the long, wide groove extends in the oblique direction to provide good tracking; and a plurality of short, wide grooves located in the portions of the ribs adjacent to the axially outer edges of the tread, one short, wide groove being located between each adjacent pair of long, wide grooves at the first and second axially outer edges, each short, wide groove being connected through a transverse groove with a short, wide groove located in the portion of a rib adjacent to the opposite axially outer edge of the tread to aid in water evacuation.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
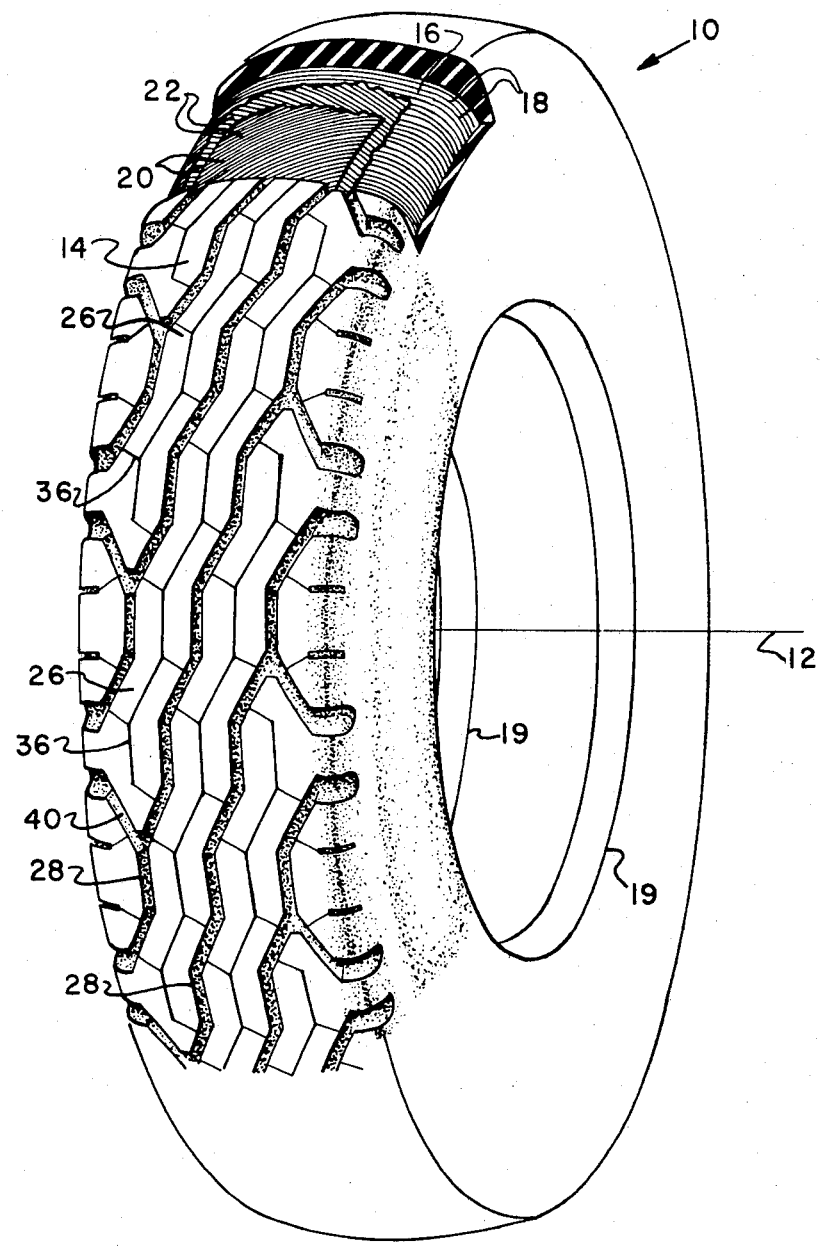
FIG. 1 is a perspective view, partly schematic, of a tire embodying the present invention with a portion of the tread cut away to illustrate the reinforcing cords of the tire.

Referring to the drawings, FIG. 1 shows a toroidal-shaped tire 10 having a rotational axis 12. A tread 14 extends circumferentially about the axis 12. Reinforcement of the tire 10 is provided by a carcass of one or more plies 16 of reinforcing cords 18 extending between the beads 19 and two or more belt plies 20 of reinforcing cords 22 between the tread 14 and carcass.

Tire 10 is a heavy-duty radial tire which is primarily adapted for use as a free-rolling truck tire but which should not be construed as restricted to such use. For the purpose of this specification and the claims, a "heavy-duty tire" is defined as a tire having a size of 7.50R15TR or larger to be used on heavy-duty vehicles such as trucks. A "radial tire" refers to one whose carcass ply reinforcing cords extend at an angle relative to the mid-circumferential plane 24 of the tire of substantially 90 degrees; that is, between 75 and 90 degrees. The mid-circumferential plane of a tire is defined, for the purposes of this specification and the claims, as a plane disposed at right angles to the rotational axis of the tire and which lies midway between the first and second axially outer edges of the tread. The axially outer edges of the tread are determined by the tire's footprint; that is, the portion of the tread which touches a level surface of a road or the ground when a tire is mounted on a vehicle, under rated load and rated pressure. The terms "axial" and "axially" refer to a direction parallel to the rotational axis of a tire. As shown in FIG. 1, the carcass ply reinforcing cords 18 extend at an angle relative to the mid-circumferential plane 24 of substantially 90 degrees.

The tread 14 is provided with a plurality of parallel ribs 26 separated and defined by a plurality of long, wide grooves 28. The long, wide grooves 28 are transverse grooves that extend between the first and second axially outer edges of the tread. By a wide groove is meant that the groove has a width, as measured in a direction perpendicular to a side of the groove and as illustrated at 30 in FIG. 2, of at least about 3 percent of tread width so as to remain open as the grooves pass through the footprint of the tire. The tread width is the distance between the first and second axially outer edges of the tread measured in a direction parallel to the rotational axis 12 of the tire at the widest point of the tire's footprint. Although these long, wide grooves 28 may be wavy, straight, zig-zag, or have some other configuration consistent with good engineering practice, it is preferred that each of these long, wide grooves 28 extend alternately in a substantially circumferential direction of the tire 10, as shown by groove segment 32 in FIG. 2, to provide the advantages of good tracking associated with circumferential grooves, then in a direction oblique to the substantially circumferential direction, as shown by groove segment 34 in FIG. 2, to provide good traction. The distance which each long, wide groove 28 extends in the substantially circumferential direction is preferably equal to between one-half and twice the distance which it extends in a direction oblique to the circumferential direction. The width of each of these wide grooves is preferably no more than 10 percent of tread width.

In order to provide a ribbed tire for such uses as a free-rolling tire and to eliminate or substantially reduce "river wear" and uneven shoulder wear in the tire, each of the ribs 26 is inclined to the mid-circumferential plane 24 of the tire and extends between the first and second axially outer edges of the tread, across substantially the entire width of the tread 14. Each of the ribs 26 also extends over an arc of the tread 14 which is equal to at least 45 degrees and not more than about 180 degrees.

Isolated blades or other narrow grooves such as shown at 36 may be located within each of the ribs 26. By a narrow groove is meant that the groove has a width, as measured in a direction perpendicular to a side of the groove and as illustrated at 38 in FIG. 2, of not more than about 2 percent of tread width.

A plurality of short, wide grooves, as illustrated at 40, are located in the portions of the ribs adjacent to the axially outer edges of the tread 14, with at least one short, wide groove being located between each adjacent pair of long, wide grooves 28 at the first and second axially outer edges of the tread. The ribs 26 are uninterrupted by any wide grooves over substantially their entire length. By this is meant that the short, wide grooves may overlap partially in the axial direction, as shown at dashed line 42 in FIG. 2, only one of the long, wide grooves 28 which define the respective rib 26 and such as to extend, in a direction parallel to the rotational axis of the tire, a distance equal to not more than about 35 percent of the tread width. Each short, wide groove 40 extends between the respective axially outer edge of the tread and a transverse groove, such as one of the long, wide grooves 28, and therefore each of the short, wide grooves is connected through a transverse groove with a short, wide groove located in the portion of a rib adjacent to the opposite axially outer edge of the tread to aid in water evacuation. As shown in the drawings, the long, wide grooves 28 preferably extend continuously between the first and second axially outer edges of the tread, across the entire width of the tread 14.

Figure 2:
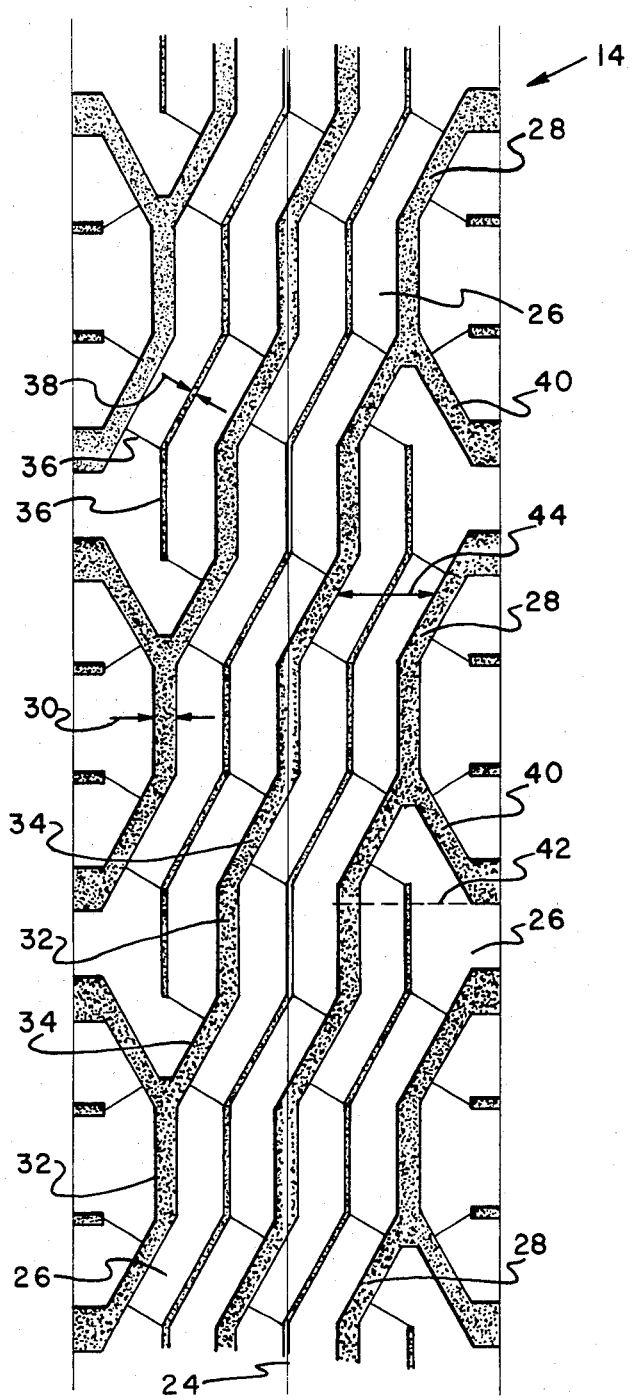
FIG. 2 is a front view of a tread portion of the tire shown in FIG. 1.

The width of each rib 26, as measured in a direction parallel to the rotational axis 12 and as illustrated at 44 in FIG. 2, is preferably between 15 percent and 50 percent of the tread width.

Figure 3:
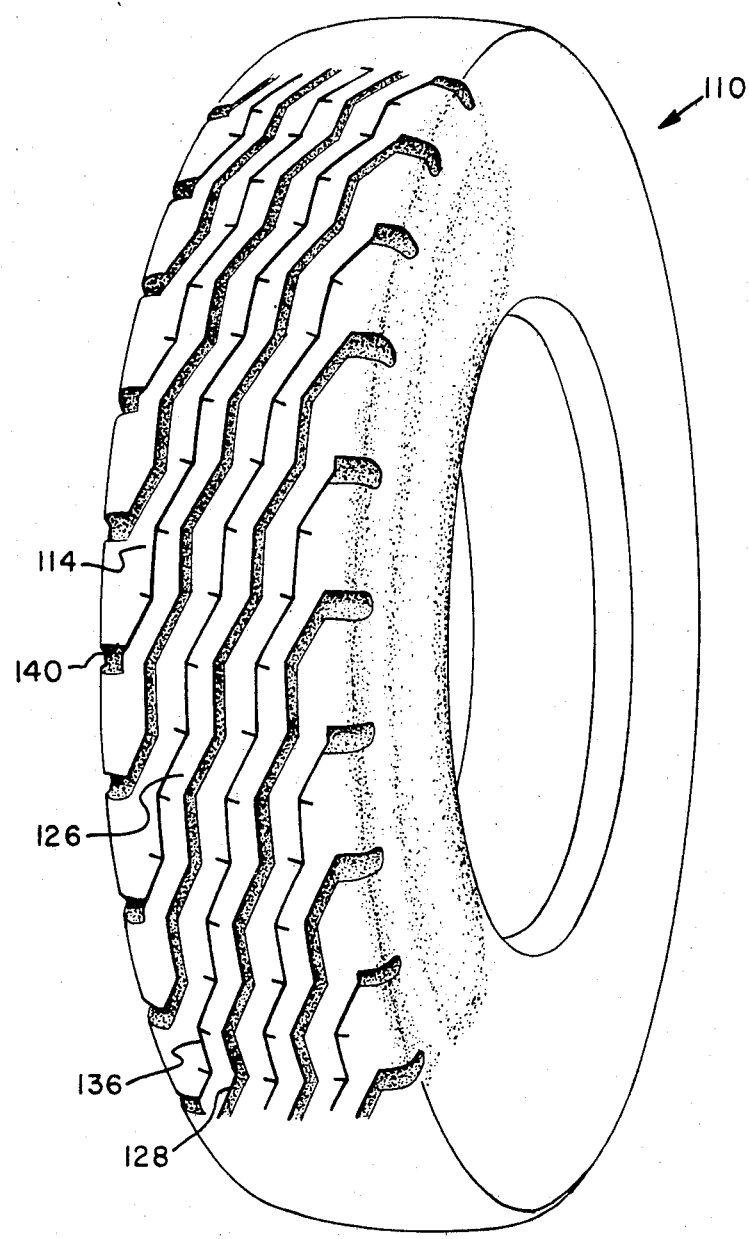
FIG. 3 is a view similar to that of FIG. 1 showing an alternative embodiment of the present invention.

An alternative embodiment of the present invention is shown in FIG. 3. The tire 110 of FIG. 3 is a heavy-duty radial tire whose tread 114 is provided with a plurality of substantially parallel ribs 126 separated by long, wide grooves 128 similar to the ribs 26 and wide grooves 28 of FIG. 1. Each of the ribs 126 is inclined to the mid-circumferential plane of the tire and extends over an arc of the tread 114 which is equal to at least 45 degrees and not more than about 180 degrees. Narrow grooves 136 are provided in the ribs 126. The tire 110 is provided with a plurality of short, wide grooves 140 similar to the short, wide grooves 40 of FIG. 1. Each of the short, wide grooves 140 extends between the respective axially outer edge of the tread and a transverse groove, such as one of the narrow grooves 136, and therefore each of the short wide grooves is connected through a transverse groove with a short, wide groove located in the portion of a rib adjacent to the opposite axially outer edge of the tread to aid in water evacuation.

In addition, the narrow grooves 136 have a different configuration from the narrow grooves 36 of FIG. 1, and do not open into the wide grooves 128.

While certain representative embodiments and details have been shown for the purpose of illustrating the invention, it will be apparent to those skilled in the art that various changes and modifications may be made therein without departing from the spirit or scope of the invention.

What is claimed is:

1. A radial tire having a rotational axis and a tread, with first and second axially outer edges, said tread having a tread width equal to the distance between said first and second axially outer edges as measured parallel to said axis, said tread extending circumferentially about said axis, said tread comprising:
   (a) a plurality of parallel ribs extending substantially uninterrupted between said first and second axially outer edges, said ribs being inclined to the mid-circumferential plane of said tire and extending over an arc of said tread which is equal to at least about 45 degrees and not more than about 180 degrees;
   (b) a plurality of long, wide grooves extending between said first and second axially outer edges to separate and define said ribs, each said long, wide groove extending alternately in a direction oblique to the circumferential direction of said tire to provide good traction, and then in a direction substantially parallel to the circumferential direction of said tire a distance equal to between one-half and twice the distance said wide groove extends in the oblique direction to provide good tracking; and
   (c) a plurality of short, wide grooves located in the portions of said ribs adjacent to said axially outer edges of said tread, one short, wide groove being located between each adjacent pair of long, wide grooves at said first and second axially outer edges, each said short, wide groove being connected through a transverse groove with a short, wide groove located in the portion of a rib adjacent to the opposite axially outer edge of said tread to aid in water evacuation.

2. A radial tire according to claim 1, wherein the transverse groove connecting each short, wide groove with a short, wide groove located adjacent to the opposite axially outer edge of said tread comprises one of said long, wide grooves.

3. A radial tire according to claim 1, wherein the transverse groove connecting each said short, wide groove with a short, wide groove located adjacent to the opposite axially outer edge of said tread comprises a narrow groove in each said rib.

4. A radial tire according to claim 2, further comprising at least one narrow groove in each said rib.

5. A radial tire according to any one of claims 1, 2, 3, or 4, wherein said short, wide grooves extend, as measured in a direction parallel to said rotational axis, a distance equal to not more than about 35 percent of the tread width.

6. A radial tire according to any one of claims 1, 2, 3, or 4, wherein each of said long, wide grooves has a width which is at least about 3 percent of the tread width and not more than 10 percent of the tread width, as measured in a direction perpendicular to a side of the groove, so that said wide grooves remain open as they pass through the footprint of the tire.

7. A radial tire according to claim 5, wherein each of said long, wide grooves has a width which is at least about 3 percent of the tread width and not more than 10 percent of the tread width, as measured in a direction perpendicular to a side of the groove, so that said wide grooves remain open as they pass through the footprint of the tire.

8. A radial tire according to either of claims 3 or 4, wherein said narrow grooves have a width, as measured in a direction perpendicular to a side of the groove, of not more than about 2 percent of the tread width.

9. A radial tire according to any one of claims 1, 2, 3, or 4, wherein each of said ribs has a width, measured parallel to said axis, which is between 15 percent and 50 percent of said tread width.

10. A radial tire according to any one of claims 1, 2, 3, or 4, wherein said radial tire is a heavy-duty radial tire having a size of 7.50R15TR or larger to be used on heavy-duty vehicles such as trucks.

* * * * *